Aug. 16, 1955 P. E. PLAVAN 2,715,411
SIPHON TUBE ASSEMBLY WITH AN INTERNAL VOLUME CONTROL
Filed Nov. 1, 1949 2 Sheets-Sheet 1

INVENTOR.
PAUL E. PLAVAN
BY
Barnes, Kisselle, Laughlin & Raisch
ATTORNEYS

Aug. 16, 1955  P. E. PLAVAN  2,715,411
SIPHON TUBE ASSEMBLY WITH AN INTERNAL VOLUME CONTROL
Filed Nov. 1, 1949  2 Sheets-Sheet 2
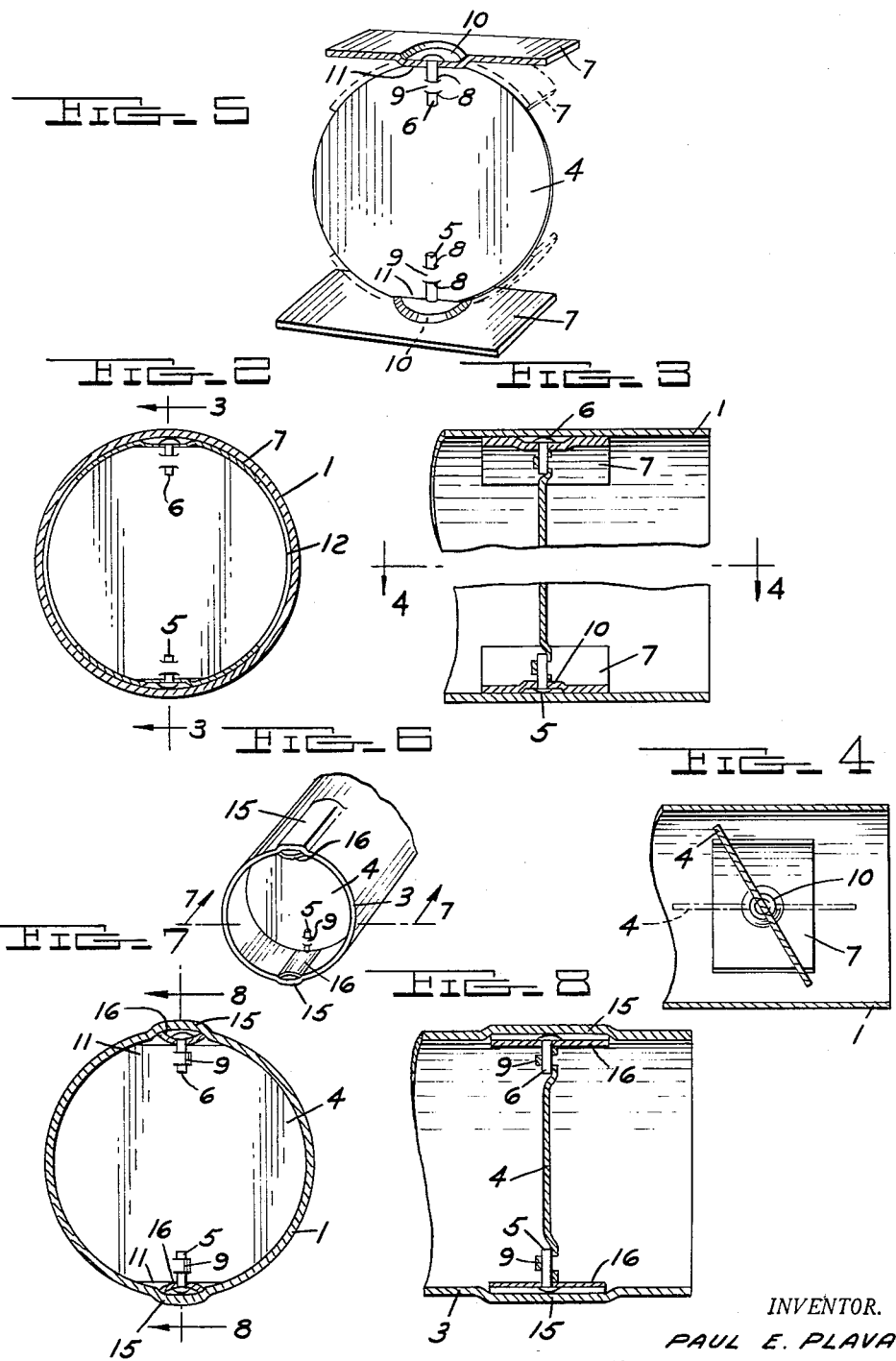
INVENTOR.
PAUL E. PLAVAN
BY
Barnes, Kisselle, Laughlin & Raisch
ATTORNEYS United States Patent Office 2,715,411
Patented Aug. 16, 1955

2,715,411

SIPHON TUBE ASSEMBLY WITH AN INTERNAL VOLUME CONTROL

Paul E. Plavan, Santa Ana, Calif.

Application November 1, 1949, Serial No. 124,825

13 Claims. (Cl. 137—151)

This invention relates to a siphon tube assembly with an internal volume control.

In irrigation farming it is common practice to water row crops in furrows by siphoning the water from the feeder ditch over the bank to the furrows by means of siphon tubes. A siphon tube usually consists of a length of metal or plastic tubing, for example, four to six feet long, bent or curved lengthwise with a deep enough bend so that when the tube is placed with the bight portion of the bend upon the ditch bank, the inlet end will be submerged in the water in the feeder ditch and the outlet end will be located in the furrow. In accordance with well known siphoning principles the volume delivered by a siphon tube will vary primarily with the head, that is, the difference in elevation between the surface of the water in the feeder ditch and the surface of the water in the furrow.

The furrows are usually positioned perpendicular to the feeder ditch and one siphon tube is used for each furrow. The depth of the water in the feeder ditch also varies in depth from one end of the feeder ditch to the other. The water in the feeder ditch has its greatest depth at the point at which the water is supplied or fed into the feeder ditch and the depth decreases toward the remote end of the ditch. Since water is expensive and usually rationed in irrigated regions, waste should be avoided. Thus, it is important that all furrows be given substantially equal volumes or amounts of water. Each siphon tube will deliver a volume of water generally in proportion to the depth of the water in the feeder ditch, that is, a siphon tube near the supply end of the feeder ditch will take a greater proportion of the water from the feeder ditch than a siphon tube located near the remote end of the feeder ditch where the water is shallower. To avoid the near furrows from receiving a greater share of water than the remote furrows ("near" and "remote" with reference to the supply end of the feeder ditch), the operator of the tubes must be diligent to remove each tube from its respective furrow whenever the desired volume has been fed from the feeder ditch into the furrow, but this procedure is time consuming and inefficient.

It is an object of this invention to produce a siphon tube with a volume control which obviates the above set forth disadvantages and which can be used to siphon water from the feeder ditch into the furrow at any desired rate of continuous flow, irrespective of the variation in head between furrows and feeder ditch from one end of the feeder ditch to the other.

This invention also contemplates an inexpensive siphon tube with a volume control in which the rate of flow can be easily varied at any time by a simple manipulation requiring only the use of the index finger of the operator at the submerged or outlet end of the siphon tube.

It is an object of this invention to produce a siphon tube with a flow control in which the flow of water through the tube can be started with the same ease and facility that it can be started through a plain siphon tube with no flow control.

In the watering of row crops in furrows with siphon tubes, when a row of furrows has been irrigated, the tubes are removed to another row of furrows and this process is repeated until the entire field or crop has been irrigated. This procedure necessarily requires considerable manual handling of the tubes. This invention contemplates a siphon tube with a flow control which can be manually handled with the same facility and ease and which will occupy exactly the same space and have the same configuration as a plain siphon tube, that is, a tube with no flow control.

In the drawings:

Fig. 2 is a transverse cross section through my tube adjacent the outlet end and showing the flow control valve.

Fig. 3 is a section along the line 3—3 of Fig. 2.

Fig. 4 is a section along the line 4—4 of Fig. 3.

Fig. 5 is a detail view showing the valve assembly removed from the siphon tube.

Fig. 6 is a perspective showing my siphon tube with a modified form of valve assembly.

Fig. 7 is a transverse section of my siphon tube assembly taken along the line 7—7 of Fig. 6.

Fig. 8 is a transverse section of my siphon tube assembly taken along the line 8—8 of Fig. 7.

Figure 1:
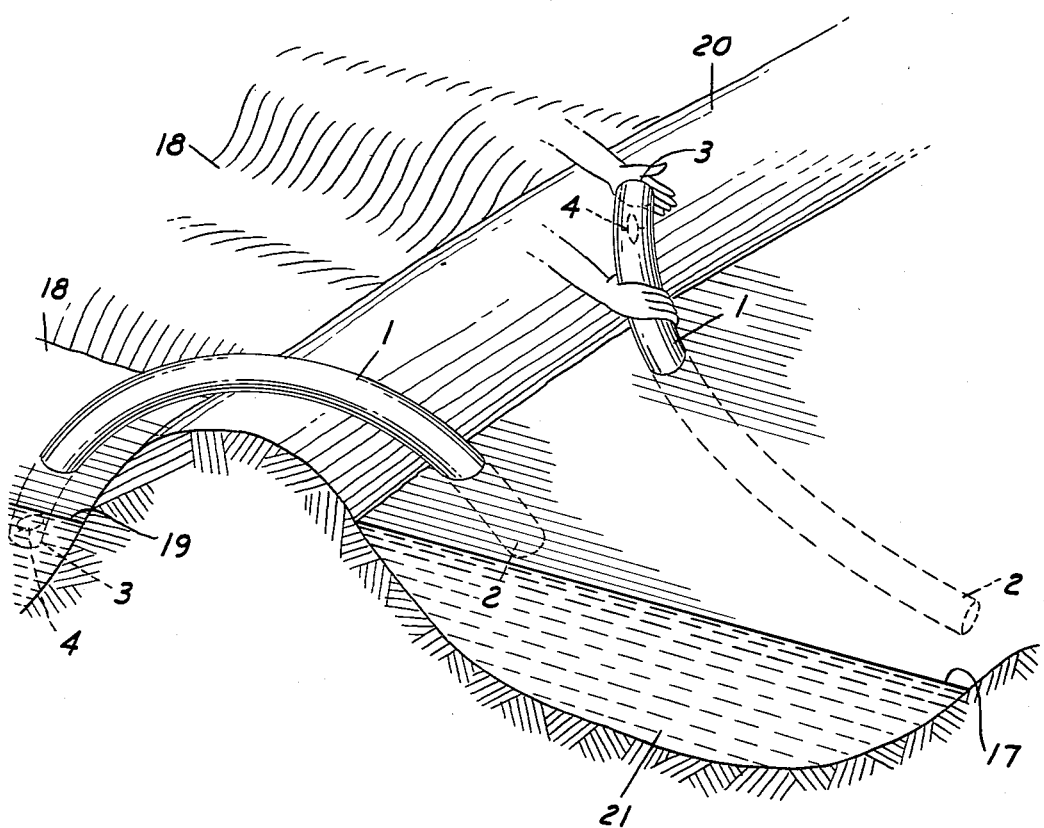
Fig. 1 is a perspective view illustrating both the starting of flow in my siphon tube and the use of my siphon tube for delivering water from the feeder ditch to the furrow.

Referring more particularly to the drawings there is shown a siphon tube 1 which can be made from any suitable material such as metal or plastic. Preferably tube 1 is a seamless tube and can, if desired, be made from aluminum. Tube 1 is curved or arched lengthwise and the inlet end is designated 2 and the outlet end 3.

Siphon tube 1 is provided adjacent its outlet end 3 with a flow control valve 4. Flow control valve 4 is positioned close to the outlet end 3 of tube 1 where it can be readily adjusted by manual manipulation. Since the valve will be adjusted by the operator reaching his index finger into the outlet end 3 of the tube, valve 4 should be located close to, and in any event not more than three or four inches from, the outlet end of the tube where it can be readily reached for manual adjustment. Preferably the axis of the valve is positioned inwardly from the outlet end 3 of the tube a distance slightly greater than the radius of the tube. Since valve 4, which is a butterfly type of valve, is adjustable to vary the rate of continuous flow through tube 1, it is essential that the valve should remain in whatever position to which it is adjusted and that this adjustment should not be changed by the pressure of the water flowing through the tube. A preferred arrangement for maintaining valve 4 in its adjusted position is that of mounting valve 4 upon a friction pivot. To this end valve 4 is provided with an axis about which it swings in the form of pintles 5 and 6 which are supported on thin plates of spring metal 7. Plates 7 are normally flat, as shown in Fig. 5. Pintles 5 and 6 can be secured to valve 4 in any suitable manner.

Valve 4 is provided with spaced shears or cuts 8. The metal between and on opposite sides of the shears is bent in opposite directions to form straps 9. Pintles 5 and 6 are passed beneath, held tightly by, straps 9 and thus provide an axis about which valve 4 swings. Plates 7 are embossed radially inwardly in the area 10 immediately surrounding each pintle 5 and 6 to provide a flat annular surface. The diametrically opposite circumferential portions of valve 4 are sheared off along cord 11 to provide straight edges which frictionally engage flat disc-like spring surfaces 10 to provide a friction hinge or pivot which holds valve 4 in its adjusted position.

To mount the valve assembly (Fig. 5) in siphon tube 1 adjacent the outlet end 3, spring support plates 7 are flexed radially inwardly to assume the inside curvature of tube 1 (dotted line shown in Fig. 5) and the valve assembly is then slipped into the tube through outlet end 3. When assembled in the tube, plates 7 are held in tension by the inside face of the tube and are positioned between the circumference of valve 4 and the inner face of tube 1, thus providing a small gap or clearance 12 between the circumference of the valve 4 and tube 1 when the valve is in fully closed position. It is desirable to maintain this clearance 12 as small as possible. Consequently plates 7 should be made from thin spring stock, preferably in the neighborhood of 1/32 of an inch or less. Since plates 7 are in tension when the valve assembly is positioned in tube 1, flat embossment 10 of each plate 7 is yieldably urged against straight edges 11 and thus cooperate to provide friction hinges between valve 4 and spring plates 7 which hold valve 4 in its adjusted position. Spring plates 7 frictionally engage the inner face of tube 1 to hold the valve in position but the valve assembly can be pulled out of the tube if desired.

Figs. 6 through 8 show a modified form of mounting of the butterfly valve in the siphon tube 1. Siphon tube 1 is provided adjacent its outlet end 3 with two diametrically opposed longitudinal outward embossments 15. Valve 4 has substantially the same diameter as the internal diameter of tube 1. In this form of the invention the spring plates 16, which support pintles 5 and 6, are normally curved or bowed outwardly or away from the straight edges 11 of valve 4. When the valve assembly is assembled into the outlet end 3 of tube 1, spring plates 16 slide into embossed recesses 15 and valve 4 fits within tube 1 with only sufficient clearance to permit swinging of valve 4. Springs 16, when mounted in recesses 15, are flattened from their normally bowed condition and thus frictionally and yieldably engage the straight edges 11 of valve 4 around pintles 5 and 6 to provide a friction hinge which holds the valve in its adjusted position.

In the form shown in Figs. 6, 7 and 8 there is substantially no clearance between the circumference of valve 4 when closed and the inner wall of tube 1 except for a slight clearance about pintles 5 and 6. However, in both forms of the invention the clearance between the inner wall 2 and valve 4 is not substantial and any flow of water through the tube when the valve 4 is fully closed is inconsequential.

The valve assembly and tube 1, in accordance with good practice, will be made of non-corrosive materials, either plastic or metal, for example, aluminum, brass, stainless steel, or known plastics useful for tubing.

Fig. 1 illustrates the use of my siphon tube 1. The feeder ditch is designated 21 and the level of the water therein 17, the furrows are designated 18, the level of the water in furrows 18 is designated 19, and the bank between the feeder ditch 21 and furrows 18 is designated 20. Siphon tube 1 is primed by first setting valve 4 in open position, grasping the pipe with the right hand adjacent the outlet end and placing the flat of the left hand over the outlet end 3, as illustrated in Fig. 1. The inlet end 2 of the pipe is submerged in the feeder ditch and the pipe then moved quickly or sharply back and forth against the feeder ditch water, allowing the air to escape under the left hand at each inward stroke of the pipe. The left hand acts as an air check valve and cuts off the return of any air at each movement. The siphon tube will be filled after two or three such movements, at which time the left hand is pressed firmly over the outlet and the outlet end 3 of the tube slid over bank 20 into the furrow 18 with the outlet end 3 positioned at its proper level, for example, two to four inches below the level 17 in the feeder ditch 21. The left hand is now promptly removed from the inlet end 2 and the flow of water from ditch 21 into furrow 18 begins. The operator now reaches into the outlet end 3 of the tube 1 with his index finger and swings valve 4 to whatever position indicated by the operating conditions obtaining between the feeder ditch and the furrows to thereby check or cut down the flow of water through tube 1 to the desired rate. When the furrows are newly made, a higher rate of flow of water through the siphon tube is desired. This can be taken care of by placing valve 4 at wide open position. Later, when the furrow is filled to the end, a lesser rate of flow may be indicated, in which case the volume or rate of flow through the siphon tube is reduced by partially closing valve 4. The ease with which each valve 4 can be adjusted to its desired position is obvious in view of the above and the friction hinge will always retain valve 4 in its adjusted position.

It will be noted that the tube 1 is imperforate from one end to the other and the mounting of the hinge assembly 4, 5, 6, 7, and 16 in the tube does not require any perforations in the wall of the tube. This is an important factor in priming of siphon tube 1 because any perforation in the tube would leak air and break the vacuum and prevent priming of the tube and would also destroy the siphon action of the tube provided the level of the water in furrow 18 was below the assumed perforations. Thus, it will be seen that my siphon tube with a flow control valve assembly arrangement can be primed as easily as an ordinary siphon tube without any flow control valve. Further, when it becomes necessary to move my siphon tubes, they can be picked up manually and stacked in the carrier's arms with the valve assembly offering no obstruction to such stacking and in no wise hindering the stacking and carrying of the tubes from one part of the field to another. It will also be noted that the tubes can be dropped or roughly handled and unless the force is sufficient to destroy the siphon tube 1, it will not destroy or injure my siphon tube with its flow control valve assembly.

I claim:

1. A siphon tube having an inlet end and an outlet end and being otherwise imperforate, said tube having a longitudinal bend therein between its inlet and outlet ends, a butterfly valve positioned wholly within said tube adjacent said outlet end so that when said valve is fully open the outlet end of the tube may be sealed by placing the palm of the hand flatly thereover, said valve being generally circular and having substantially the same circumference as the inner circumference of the tube, pintle means upon which the valve is pivotally mounted, a flexible spring support plate for each end of said pintle means and upon which the pintle is supported, said spring support plates each having a resilient frictional engagement with the inside face of the tube and being held under tension between the edge of the valve and the inner face of the tube.

2. A valve assembly for use with a siphon tube comprising a butterfly valve, pintle means, spring support plates associated with said pintle means for pivotally supporting said valve, said spring support plates being adapted to be flexed when inserted in the siphon tube and to yieldably and frictionally engage the tube for holding the valve assembly in position within the tube, and friction means for holding the valve in adjusted position within the tube.

3. A valve assembly for use with a siphon tube comprising a butterfly valve, pintle means on said valve, a readily flexible resilient supporting member associated with said pintle means for pivotally supporting said valve within a siphon tube, said resilient supporting member being adapted to be flexed when the valve assembly is inserted in a siphon tube to yieldably and frictionally engage the inner surface of the tube for holding the valve assembly in position within the tube, and friction means for holding the valve in adjusted position within the tube.

4. An arched siphon tube having an inlet and an outlet end and being otherwise imperforate, said tube having a diameter at the outlet end less than the width of the palm of the hand, flow regulating means comprising a butterfly valve pivotally supported wholly within the tube when open and being spaced inwardly of the outlet end thereof so that the palm of the hand can be placed over said outlet end to effectively seal said outlet end, said valve when fully open having a portion disposed closely adjacent said outlet end such that it can be adjusted directly by the hand of the operator, the butterfly valve having substantially the same diameter as the inner diameter of the tube, and friction means for holding the valve in its adjusted position, said friction means being positioned adjacent the outlet end of the tube and a distance from the outlet end of the tube at least equal to the radius of the tube, said friction means comprising a spring plate held in tension by and between the edge of the valve and the inner wall of the tube, said valve being provided with a pintle an end of which is supported by the spring plate.

5. A siphon tube having an inlet and an outlet and being otherwise imperforate, said tube having a longitudinal bend therein between its inlet and outlet, a butterfly valve positioned wholly within said tube adjacent said outlet and having substantially the same circumference as the inner circumference of the tube, pintle means within the tube upon which the butterfly valve is pivotally mounted, and friction means positioned within the tube and acting upon the valve for holding the same in adjusted position, said friction means comprising a spring plate held under spring tension between the inside face of the tube and the edge of the valve adjacent its axis, the said plate having a frictional contact with the edge of the valve.

6. The combination claimed in claim 5 wherein the edge of the valve contacting said spring plate is a straight edge in the form of a cord cutting across the axis of the valve.

7. A valve assembly adapted to be flexed and thereby inserted into a siphon tube with the flexed portions of the valve frictionally engaging the inner surface of the tube to hold the valve assembly in position within the tube comprising a butterfly valve, pintle means on said valve, a resilient supporting member associated with said pintle means for pivotally supporting said valve, said resilient supporting member being adapted to be flexed, said resilient supporting member having a portion adjacent said pintle which frictionally engages the edge of the valve when the supporting member is flexed to hold the valve in the adjusted position.

8. A siphon tube having a longitudinal bend therein, said siphon tube having an inlet and an outlet and being otherwise imperforate, flow regulating means comprising a valve assembly, said valve assembly including a pivotally supported valve member and a pair of resiliently flexible supporting members, said supporting members having portions thereof yieldably engaged with the inner face of said tube to hold the valve assembly in position within said tube, said valve assembly being positioned such as to be disposed wholly within the tube when fully open and when fully open said valve member having a portion disposed closely adjacent said outlet whereby it can be adjusted directly by the hand of the operator.

9. An arched siphon tube having an inlet and an outlet end and being otherwise imperforate, said tube having a diameter at its outlet end less than the width of the palm of the hand, flow regulating means comprising a butterfly valve pivotally supported within the tube and having substantially the same diameter as the inner diameter of the tube, said valve being positioned such as to be disposed wholly within the tube when fully open so that the palm of a hand can be placed over said outlet end to effectively seal said outlet end and having a portion disposed closely adjacent the outlet end of the tube whereby it can be adjusted directly by the hand of the operator to vary the rate of flow through the tube and friction means wholly within the tube for holding the valve in its adjusted position.

10. The combination claimed in claim 9 wherein the valve and friction means are positioned wholly within the tube, adjacent the outlet end of the tube and a distance from the outlet end of the tube at least equal to the radius of the tube.

11. A valve assembly adaped to be flexed and thereby inserted into a siphon tube with the flexed portions of the valve frictionally engaging the inner surface of the tube to hold the valve assembly in position within the tube comprising a butterfly valve, pintle means, spring support plates associated with said pintle means for pivotally supporting said valve, said spring support plates being adapted to be flexed, each spring plate being embossed inwardly in the area adjacent the pintle to provide a surface for frictional engagement with the edge of the valve around the pintle when the spring plate is flexed.

12. The combination claimed in claim 11 wherein the valve adjacent the pintle is provided with a straight edge in the form of a cord for frictionally contacting the flat embossed face on the spring plate.

13. A siphon tube having an inlet and an outlet and being otherwise imperforate, said siphon tube having a longitudinal bend therein and having a diameter adjacent its outlet less than the width of the hand, a butterfly valve in said tube, said valve being positioned such as to be disposed wholly within the tube when fully open so that when the valve is fully open, the outlet of the tube can be sealed by placing the palm of the hand flatly thereover, said valve being adjustable within the tube to vary the rate of flow through the tube and friction pivot means located within the tube and frictionally holding the valve in its adjusted position.

References Cited in the file of this patent

UNITED STATES PATENTS

| | | |
|---|---|---|
| 152,492 | Horton | June 30, 1874 |
| 1,211,085 | Chandler | Jan. 2, 1917 |
| 1,472,428 | Case | Oct. 30, 1923 |
| 1,757,872 | Mitchell | May 6, 1930 |
| 2,206,749 | Morgan | July 2, 1940 |
| 2,272,655 | Braiese | Feb. 10, 1942 |
| 2,393,867 | Nicholson | Jan. 29, 1946 |

FOREIGN PATENTS

| | | |
|---|---|---|
| 59,245 | Germany | Oct. 12, 1891 |